April 22, 1947.   C. R. BUSCH   2,419,312
CAR BRAKE HEAD
Original Filed Aug. 5, 1943
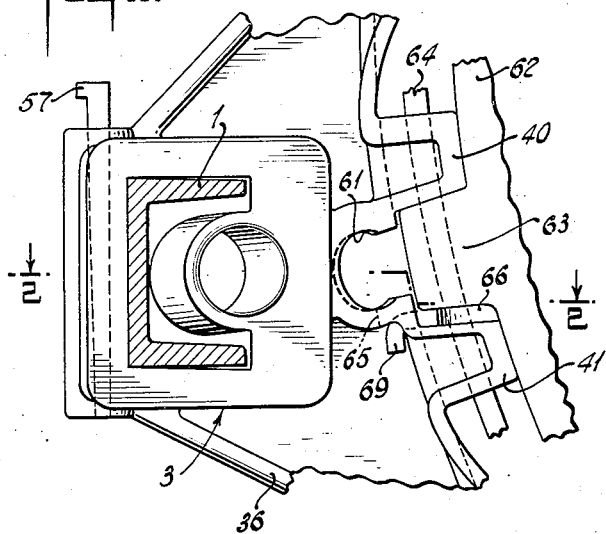
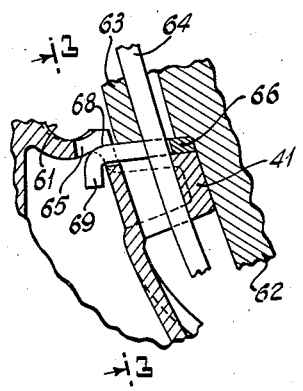
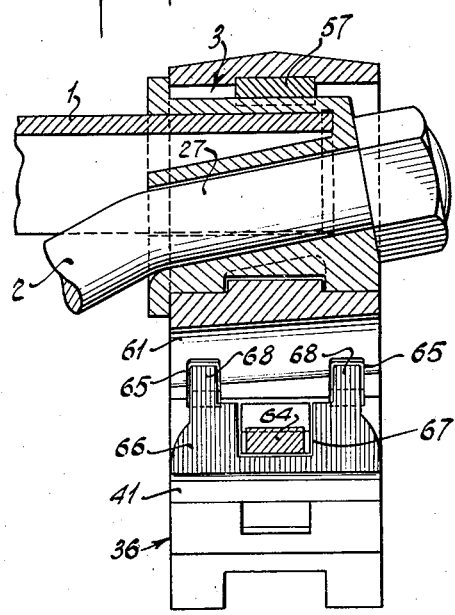
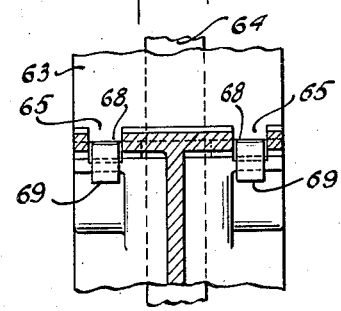
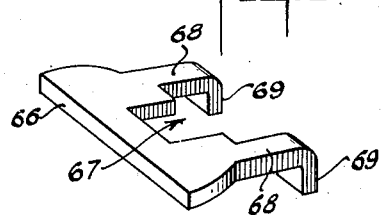
INVENTOR
CHARLES R. BUSCH.
BY
Geo L. Wheelock
ATTORNEY Patented Apr. 22, 1947

2,419,312

UNITED STATES PATENT OFFICE 2,419,312

CAR BRAKE HEAD

Charles R. Busch, Orange, N. J., assignor to Buffalo Brake Beam Company, New York, N. Y., a corporation of New York Original application August 5, 1943, Serial No. 497,418, now Patent No. 2,398,918, dated April 23, 1946. Divided and this application June 16, 1944, Serial No. 540,655

7 Claims. (Cl. 188—243)

This application is a division of my application Serial No. 497,418, filed on August 5, 1943, and issued as Patent No. 2,398,918 on April 23, 1946, and relates to improvements in the means to relieve or protect against wear the under lug of the two lugs of a brake head between which the back lug of a brake shoe is inserted so that it may be keyed to the head, to which end a lining or covering for such under lug is provided and which is made of a wear resisting material that is harder and stronger than that of which the head is made, such lining being in the form of a plate which, while very simple in construction, is adapted to be easily and quickly applied to and removed from the head, it safely interlocking therewith and thus protecting the head against wear due to the jiggle and weight of the brake shoe.

A further object is to provide a lining for such purpose, which, though readily removable, is so interlocked with a brake head that it remains in position during the brake shoe changes.

With the above stated and other objects in view, the present invention consists of certain features of construction and combinations of parts to be hereinafter described and then claimed, with reference to the accompanying drawings illustrating a preferred embodiment of the invention, and in which—

Figure 1 is a broken side elevation of as much of a brake head and shoe as is necessary to show the present improvements in side elevation, parts being in broken lines;

Figure 2 is a section on line 2—2, Fig. 1, as viewed in the direction indicated by the arrows;

Figure 3 is a sectional elevation on line 3—3, Figure 4, looking in the direction shown by the arrows;

Figure 4 is a broken detail section of brake head, shoe and wear plate, taken in the vertical plane thereof; and Figure 5 is a perspective view of the wear plate.

Referring to Figures 1 and 2, there is shown a portion 1 and a portion 2 of the compression and tension members, respectively, of a trussed brake beam, a truss locking member 3 and a brake head 36. Said figures show the end portion 27 of tension rod 2 as passing through the member 3 so as to be secured by a nut seated against said member, and also show a key 57 whereby the brake head 36 is secured to the brake beam. The parts noted may be constructed, arranged, and may function in accordance with corresponding parts disclosed by application, Serial No. 497,418, before mentioned.

The brake head is provided with the customary pair of forward lugs 40, 41 and with a transverse forwardly open opening 61 for the brake hanger, in front of which the brake shoe 62 has its customary intermediate lug 63 entered between the head lugs 40, 41, and there passing through the three lugs an ordinary brake-shoe key whereby the brake shoe is secured to the head.

In accordance with the preferred construction of the present invention, the wall of the hanger opening 61 is provided with one or more, preferably two, through slots 65, 65, which are aligned transversely of the head and located in the juncture between the upwardly projecting lower forward portion of said wall and the lower head lug 41, as shown in Figures 2, 3 and 4. In their vertical extent these slots are substantially of upside down L-shape, the upper arm of each L extending rearwardly into the upwardly directed forward portion of the wall of the hanger opening 61 and the lower arm thereof extending slightly downwardly in the front wall of the brake head to a point substantially flush with the upper surface of the lug 41, as more clearly shown in Figure 4.

A wear plate or partial lining 66, as shown in Figure 5 in detail, is provided which is best composed of harder material or metal than that of the brake head, such as a tempered piece or plate of steel or the like. As shown, such wear plate or lining has a notch 67 located midway between a pair of rearwardly extending parallel, arms or bifurcations 68, 68, each arm being bent to provide a down-turned lip 69, so that each arm forms a hook or the like terminating the rearward extent of the plate.

It will be seen from Figures 1 to 4 that such wear plate 66 is interlocked with the brake head, its main portion in front of the arms 68, 68, and the forward portions of the arms covering in a protective manner the upper surface of the lug 41, and the locking hooks 68, 69, extending rearwardly through the downward portions of the slots 65, 65, at points between the hanger opening and the lug 41, while the down-turned lips 69, 69, engage the brake head behind its front wall at points below where the hanger opening and the front wall join and directly to the rear of the upper portion of said lug 41.

The notch 67 in the wear plate and located between the arms 68, 68, is provided for the passage therethrough of the brake shoe key 64 and is a restricted portion of the slot defined by the arms 68.

When the wear plate or lining is interlocked with the head and the brake shoe mounted thereon, the shoe lug 63 has bearing on the plate instead of directly on the head lug 41 and cannot wear the latter, so that it is protected against impairment caused by the jiggle and weight of the brake shoe when the assembly is in service. Hence, all of the area of the upper surface of the lug is substantially covered where it surrounds the key 64. In service the weight of the brake shoe and the interlock of the plate with the head hold the wear plate in position so that it cannot be accidentally dislocated, and as the wear plate is peculiarly interlocked with the head it automatically holds itself in position during the brake shoe changes.

It will be observed from Fig. 4 that the rear wall of the usual opening in the shoe lug 63 and the front wall of the usual opening in the bottom lug 41 of the brake head are relatively offset from each other to provide a restricted throat as it were, corresponding to the distance between the front and rear surfaces of that length of the key which passes through said openings, so that an unobstructed free passage for the key is provided, but yet the key will have a full bearing upon said walls of the openings. Also, it will be seen from Fig. 2 that the edges of the wear plate which define the opposite sides of the key-receiving notch 67 and the edge of the plate which defines the front end of the notch do not obstruct the entrance of the key through the restricted throat or passage referred to, as all of such edges are at least sufficiently clear of the key to avoid obstructing it.

In applying the wear plate 66 it may be tilted over the head lug 41 with the lips 69, 69, extending downwardly and, while it is tilted, to pass the lips down through both portions of each L-shaped slot 65 and to engage the lips with the back surface of the front wall of the head, whereupon the said plate is caused to swing downwardly onto lug 41 and to be interlocked with the head. Or, it is just as well to hold the plate horizontally and pass the lips 69, 69, down through the upper ends of the slots. The removable wear plate then rests by its own gravity on said lug.

It is possible that slight changes can be made in the illustrated construction of the improvements and still be within the scope of the appended claims.

What I claim as new is:

1. A car brake head provided with a pair of forward lugs and having a forwardly open transverse hanger opening therebetween, and a removable wear plate located on the upper surface of the bottom lug and interlocked at its rear with the head below the juncture between the hanger opening and the bottom lug, and such interlocking means comprising an upwardly and rearwardly extending through slot in the front wall of the head and in said juncture and a retaining element on the rear of the plate passed through the slot and engaged with the front wall at a point below the slot and behind the lug.

2. A car brake head provided with a pair of forward lugs and having a forwardly open transverse hanger opening therebetween, and a removable wear plate located on the upper surface of the bottom lug and interlocked at its rear with the head below the juncture between the hanger opening and the bottom lug, and such interlocking means comprising a through slot in the front wall of the head and in said juncture and a retaining element on the rear of the plate passed through the slot, the retaining element in the shape of a downward hook bent from the rear end of the plate and terminating the plate, and engaged through the slot at a point behind the bottom lug.

3. A wear protecting plate for the bottom lug of a car brake head and having a maximum area substantially corresponding with the area of the top surface of such lug, and such plate having a pair of retaining hooks projected downwardly from the rear limit of the maximum area and forming the means for holding the plate in protecting position, rearwardly extending lateral portions of the plate being just sufficiently spaced apart to permit a brake shoe key to pass between them, and said downward hooks extending from said spaced lateral portions and adapted to enter openings in the head.

4. The combination of a car brake head having a pair of forward lugs and a hanger opening, a brake shoe with its lug engaged between the head lugs, and the lugs provided with registering key-receiving openings, a key in said openings, the rear wall of the shoe-lug opening and the front wall of the bottom lug of the head relatively offset from each other a restricted distance such that a free passage is provided for the key which is in firm bearing upon both of said walls, a removable flat wear plate protecting the upper surface of the bottom lug and having a rearward slot through which the key passes, a pair of rearwardly extending arms on the wear plate at opposite sides of and defining the slot, inward edges of the arms and the edge of the forward end of the slot at least sufficiently clear of the key to avoid obstructing the passage of the key through the lugs and the prevention of the bearing of the key on aforesaid lug walls, and downwardly extending hooks at the inner ends of the arms and terminating the plate, the brake head having through slots in its wall located in the juncture between the hanger opening and the bottom lug, and through which slots the hooks pass and secure the plate in protecting position.

5. A car brake head provided with a pair of forward lugs and having a forwardly open transverse hanger opening therebetween, and a removable wear plate protecting the upper surface of the bottom lug, and the wear plate at its rear having a retaining element, such element terminating the plate and opposed by the back of the front wall of the head below the juncture between the hanger opening and the bottom lug whereby to provide interlocking means, and the wear plate held in position solely by such interlocking means and its own weight.

6. A wear protecting plate for the bottom lug of a car brake head, the plate having a length and area such as to substantially cover the upper surface of the lug, and provided with a pair of spaced apart rearwardly extending arms, one arm at each end of the plate and at the rear of such area, each arm having a downward hook-like element bent directly from the rear end thereof, said elements constituting the rear terminals of the plate, and the plate having means permitting a brake shoe key to be positioned therethrough.

7. A wear protecting plate for the bottom lug of a car brake head and having a length to extend transversely of the lug, the plate provided with a pair of spaced apart rearwardly extending arms, one arm at each end of the plate and each arm having a hook-like element, both elements extending from the rear of the plate, and the plate having a key-receiving notch opening rearwardly into the space between the arms, the notch having a width less than the distance between the arms.

CHARLES R. BUSCH.

REFERENCES CITED

The following references are of record in the file of this patent:

UNITED STATES PATENTS

| Number | Name | Date |
|---|---|---|
| 2,041,064 | Harbert | May 19, 1936 |
| 2,283,637 | Johnson | May 19, 1942 |
| 2,088,126 | Wright | July 27, 1937 |
| 1,910,541 | Harbert | May 23, 1933 |
| 2,110,575 | Harbert | Mar. 8, 1938 |